United States Patent [19]

Ionescu

[11] 4,235,222

[45] Nov. 25, 1980

[54] HEAT-RESPONSIVE ALIGNMENT SYSTEM AND SOLAR COLLECTION DEVICE

[76] Inventor: Istrate Ionescu, P.O. Box 697, Stratford, Conn. 06497

[21] Appl. No.: 952,759

[22] Filed: Oct. 19, 1978

[51] Int. Cl.³ .............................................. F24J 3/02
[52] U.S. Cl. .................................... 126/425; 126/438
[58] Field of Search ............... 126/270, 271, 424, 425, 126/438, 439, 452; 250/203 R; 353/3; 60/527; 33/270

[56] References Cited

U.S. PATENT DOCUMENTS

| 2,072,565 | 3/1937 | Moehle | 33/270 |
| 2,712,772 | 7/1955 | Trombe | 126/270 |
| 4,055,954 | 11/1977 | Marks et al. | 60/527 |
| 4,063,543 | 12/1977 | Hedger | 353/3 X |
| 4,158,356 | 6/1979 | Wininger | 126/425 |

OTHER PUBLICATIONS

*A Solar Powered Tracking Device,* Farber et al., Journal of Environmental Sciences, vol. 18, No. 3, pp. 11-12, May-Jun. 1975.

*Primary Examiner*—Samuel Scott
*Assistant Examiner*—Lee E. Barrett
*Attorney, Agent, or Firm*—Thomas L. Tully

[57] ABSTRACT

A system which automatically aligns itself, and any attached hardware such as a solar energy collection device, in response to changes in the solar position. The alignment system comprises a directional sunlight-admission element which is adapted to be focused over a relatively wide azimuth angle in advance of the direction of change of the solar elevation relative to the location of the device on earth, an infrared radiation-absorbing member having a fixed position relative to the sunlight admission element and aligned to receive and absorb sunlight passing through said admission element over said azimuth angle and to generate heat in response thereto, and a heat-responsive adjustment means in heat-conductive association with said radiation-absorbing member and adapted to move both said sunlight-admission element and said radiation-absorbing member in response to periodic substantial changes in temperature conducted thereto. The adjustment means is also adapted to be connected to and to move a support system for an associated working element such as a solar energy collection system, a telescope, a camera or other device, so that the associated system is automatically and periodically adjusted in response to changes in the solar elevation and azimuth as occur during the year.

9 Claims, 8 Drawing Figures

HEAT-RESPONSIVE ALIGNMENT SYSTEM AND SOLAR COLLECTION DEVICE

BACKGROUND OF THE INVENTION

The present invention is concerned primarily with solar heating systems comprising reflectors or panels adapted to receive sunlight and to reflect or absorb the heat therefrom and to convey the same to a working fluid which is circulated through a system which generally stores the accumulated heat for subsequent use.

Such solar heating systems are most effective when they are focused directly towards the sun. However, this requires frequent manual re-focusing of the reflectors or panels during the year because the solar elevation is constantly and gradually changing over an angle of about 46° during the year, particularly with respect to the location of the colder regions on earth where the benefits of solar heating systems are most needed.

Electronic alignment systems are known for the automatic tracking of the sun and for the continuous alignment of solar panels and reflectors in response to changes in the solar elevation and azimuth. However, such systems are too complex and too expensive to be practical for systems other than large commercial installations, such as office buildings, hotels, plants, and the like.

SUMMARY OF THE PRESENT INVENTION

The present invention involves a relatively simple and inexpensive mechanical alignment system which takes advantage of the heat-generating effect of focused direct sunlight to cause the periodic automatic realignment of the system in the direction in which the solar altitude is changing relative to the system's location on earth, whereby the alignment system is always focused over a wide azimuth angle slightly in advance of the solar altitude until the sun advances to the position of such focus over said wide azimuth angle to cause activation of the alignment system and movement of the system to a new focus location slightly in advance of the new solar altitude.

As can be readily understood, the present mechanical alignment system is adapted to be associated with a solar heat collection system, including a reflector or panel which performs most efficiently when focused directly towards the path of the sun, and when re-focused during the year in response to changes in the solar position. It is also adapted to be associated with other devices such as telescopes, cameras, sun shields, or the like, which it may be desired to adjust in a direction towards or away from the sun as the path of the solar position changes.

The present invention also involves an embodiment whereby the present alignment system can be manually aligned or realigned, as necessary, or can be checked periodically for proper alignment.

The present invention also involves a novel solar heating system comprising a cylindrical parabolic reflector-heat-collector carriage which is particularly well-adapted for use with the novel self-alignment system of the present invention and which comprises several embodiments which render it inexpensive, efficient and maintenance-free.

DETAILED DESCRIPTION OF THE DRAWING

Figure 1:
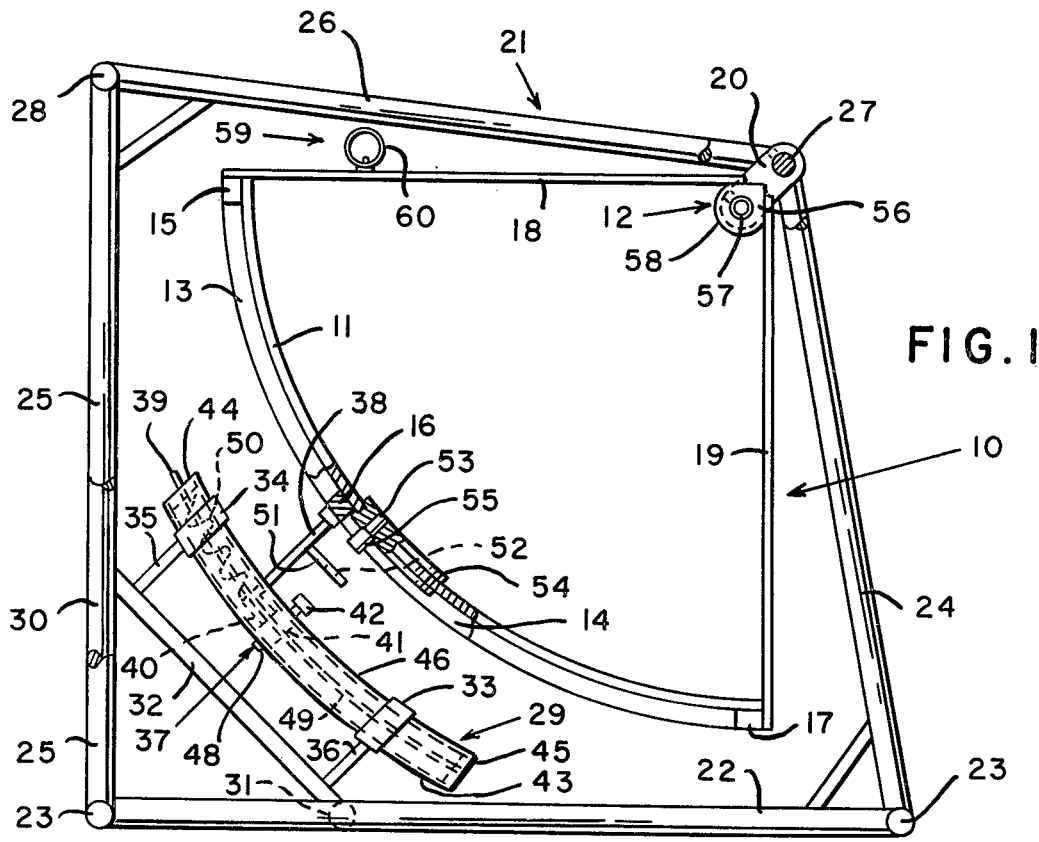
FIG. 1 is a side elevation of self-adjusting solar heating system according to one embodiment of the present invention.

The various figures of the drawing illustrate the present heat-responsive alignment devices assembled in association with an adjustable solar collection carriage 10 comprising a parabolic or curved reflective surface 11 and a heat-collector element 12 mounted in fixed spaced position relative to the reflecting surface 11 to receive and absorb the concentrated solar radiation reflected by surface 11 and to transfer the heat to a fluid circulated therethrough. The carriage 10 has a lightweight support system comprising opposed arcuate reflector ribs 13 and 14, the latter being shown in the cut-away section of FIG. 1, which support the curved reflector 11 having a reflecting surface, reflector cross-members 15, 16 and 17 and collector connector members 18 and 19 which rigidly connect the heat collector element 12 to the support system for the reflector 11 spaced therefrom, parallel to the reflector surface and directly facing the lens mounting assembly 54 discussed hereinafter. The assembly is provided with spaced hanger brackets 20 which support the water conduit 57, discussed hereinafter, in fixed position relative to the frame 21, the heat collector member 12 being rotatably connected to the water conduit 57 and supporting the carriage 10 for such rotatable movement around the frame-supporting water conduit.

Figure 2:
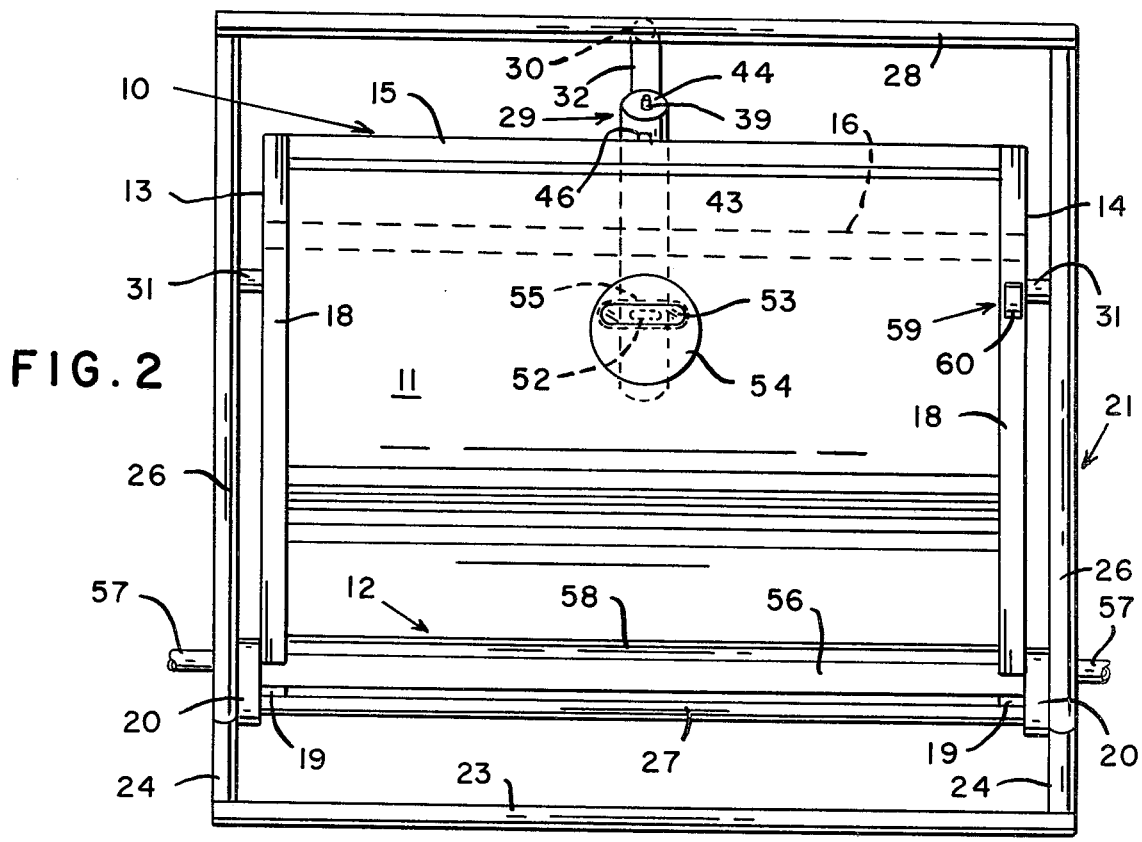
FIG. 2 is a top view of the solar heating system of FIG. 1.

The frame 21, as shown in FIGS. 1 and 2, is a simple box-type structure comprising side base members 22, front and rear base members 23, front and rear upright members 24 and 25, top side members 26 and top cross-members 27 and 28. In addition, the frame 21 includes a support structure for the heat-sensitive adjustment device 29 comprising a central rear upright member 30, positioned between and similar to rear upright members 25, central base cross-member 31 and brace member 32 which is rigidly attached to the central rear upright member 30 and the central base cross-member 31. The adjustment device 29 is rigidly but adjustably and removably attached to the brace member 32 by means of releasable clamps 33 and 34 on support bars 35 and 36 respectively.

Figure 3:
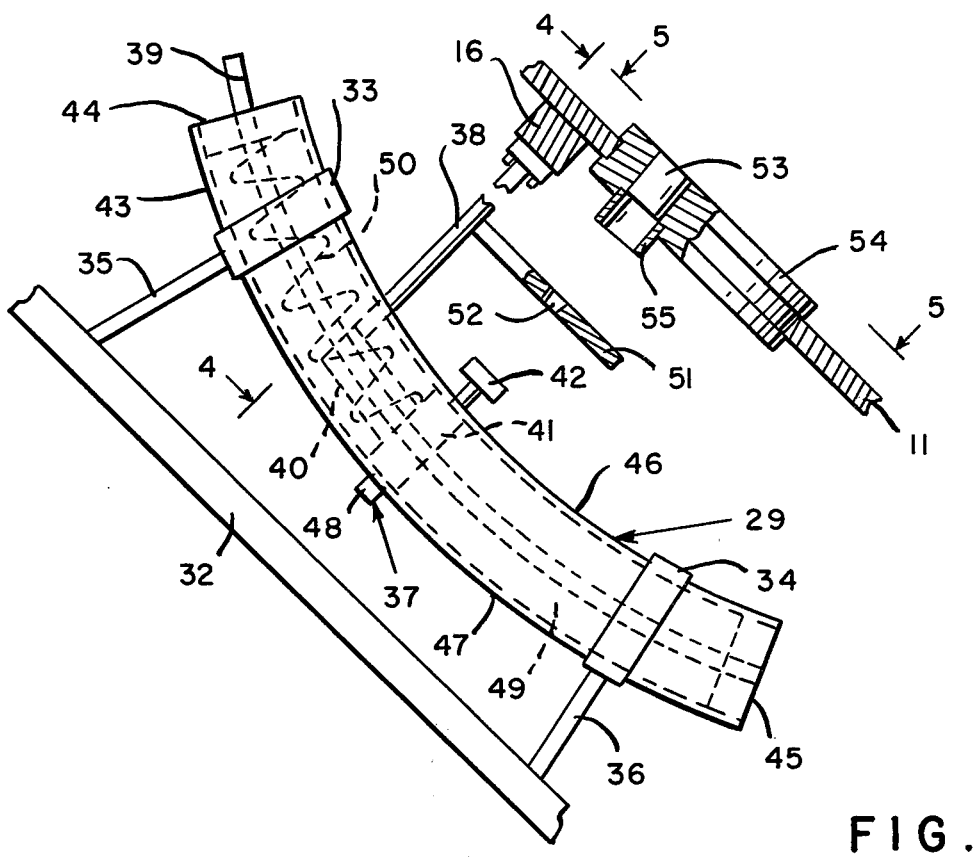
FIG. 3 is a magnified sectional side elevation of the heat-responsive adjustment element of the system of FIG. 1.

As mentioned supra, the carriage 10, including heat-collector element 12, is constructed of lightweight materials, such as aluminum, so as to be easily adjustable about its rotatable connection to the water conduit 57 which is suspended from cross bar 27. The only other attachment of the carriage 10 to the support frame 21 is its connection to the heat-sensitive adjustment device 29, which is illustrated more clearly by FIGS. 3 and 4. The device 29 is provided with a slide assembly 37 having attachment arm 38 which is rigidly attached to the underside of the reflector 11 and which is slidably attached to the central guide rod 39 within the adjustment device 29 by means of sleeve element 40. The sleeve element 40 comprises generally circular bottom flange 41 of heat-conductive material, such as a metal disc, which is in heat-conductive material, such as a metal disc, which is in heat-conductive association with a radiation-absorber plate 42 of material which is capable of absorbing infrared radiation to a high degree and of converting such radiation to conductive heat.

Figure 4:
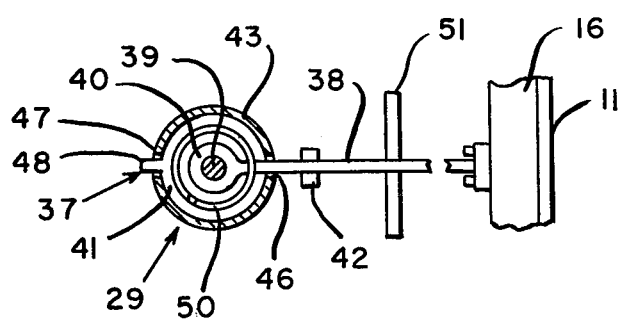
FIG. 4 is a view taken along the line 4—4 of FIG. 3.
Figure 5:
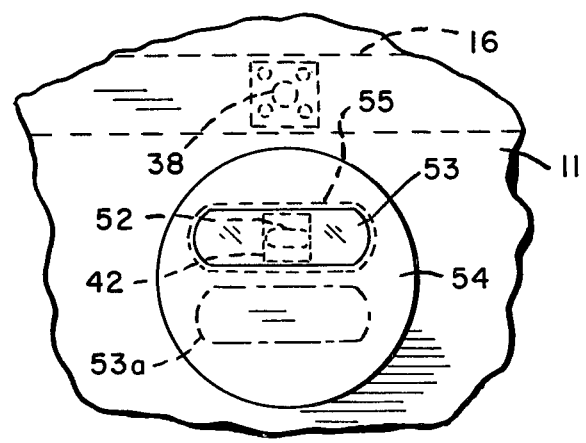
FIG. 5 is a view taken along the line 5—5 of FIG. 3.

As shown most clearly by FIG. 4, the adjustment device 29 comprises an arcuate cylinder 43, preferably formed of or coated with heat-insulating material, such as polystyrene foam. The inside diameter of the cylinder 43 is slightly larger than the diameter of the heat-conductive flange 41. The cylinder is provided with end caps 44 and 45 and with a longitudinal front slot 46, providing a track for extension of the attachment arm 38 of the slide assemby 37 through the wall on cylinder 43 and for movement of the slide assembly 37 over the central guide rod 39. Cylinder 43 also comprises a rear slot 47 which provides a rear centering track for the tab extension 48 of the heat-conductive flange 41 and also functions as an elongated drainage part for the solid, heat-flowable material 49 contained within the cylinder 43 as said material is reduced to flowable condition, i.e., melted to a liquid state or sublimed to a gaseous state. The slide assembly 37 is urged into contact with the upper surface of the solid material 49 by means of a compressed spring 50 confined between the upper cap 44 and the upper surface of the heat-conductive flange 41, and the arcuate central guide rod 39 is maintained in fixed coaxial position within the cylinder 43 by means of central wells present on the inner surface of covers 44 and 45.

The slide assembly 37 also supports a heat shield 51 having a central horizontally-elongated slot or hole 52 aligned between the infrared-absorbing plate 42 of the heat-conductive flange 41 and a focusing lens 53 mounted slightly above center on the reflecting surface 11 by means of a rotatable disc 54 which enables the disc to be rotated 180° so that the lens is slightly below center when the system is reversed to track the sun in the other direction, as will be discussed more fully later. The lens 53 is mounted within the disc 54 at a slight angle so that the direction of its focus axis is parallel in azimuth to the central axis of the carriage 10, but slightly below the same axis in elevation. This difference in elevation angle between the axis of the lens 53 and the carriage 10 creates an error angle as shown in FIG. 1. Also, the lens 53 is provided with a lower non-transparent and non-reflecting hood 55 which is mounted at the same angle as lens 53 and channels or directs the sun's rays which pass through the lens to prevent reflective radiation of the infrared absorbing plate 42 until the sun is in alignment with the direction of the focusing lens 53 or its focus axis.

The focusing lens 53 preferably comprises a horizontal segment of a wide angle lens so as to be capable of focusing the sun's rays over an angle of about 15° azimuth and only a few degrees in elevation. This, together with the elongated shape of the opening 52 in the heat shield 51, permits the sun's rays to enter the lens and strike the radiation-absorber plate over a period of from about 3 hours before noon until 3 hours after noon.

The few degrees in elevation are sufficient to cover changes in the sun's elevation over a period of about 10 or more days, thereby allowing for the possible lack of sunshine over that period of time. Greater durations of lack of sunshine require manual repositioning of the carriage 10. The wide angle focusing lens 53 adapts the present alignment system to admit the sun's rays to the radiation-absorber plate 42 over a relatively wide azimuth angle prior to and subsequent to the time when the sun reaches its greatest daily elevation, i.e., the focus axis of the lens coincides with the position of the sun at its point of maximum elevation or altitude, but the wide angle nature of the lens admits sunlight over a wide azimuth angle on either side of said point of maximum elevation. Thus, any amount of sunshine during any of the hours surrounding the time of maximum elevation will activate the self-alignment mechanism and reposition the reflector carriage. In the absence of such a lens, the sun's rays would only be admitted for a brief period when the sun reaches its point of maximum daily elevation and it is possible that cloud cover might be present at such time of day to prevent the sun's rays from reaching the radiation-absorber plate 42. This liklihood is reduced by the use of the wide angle lens and wide angle opening 52 in heat shield 51.

The solar heat collector 12 comprises an insulated hood 56 of plastic or sheet metal, such as aluminum through which a conduit 57, such as copper tube containing a heatable working liquid, is circulated, conduit 57 being a segment of a continuous circulation conduit of a conventional solar heat storage system in which the working liquid heated in the collector 12 is circulated to or through a heat storage tank containing liquid which becomes heated for subsequent use, the working liquid being recirculated back to the heat collector 12 for reheating. The heat collector 12 also preferably contains a curved concentrating lens 58 which encloses the entire face of the hood 46 and which further concentrates the radiation reflected by reflector 11 onto the conduit 57. The ends of the heat collector 12 preferably are covered to retain the heat within the hood 56. The collector 12 must be installed so as to allow free adjustment motion to the carriage 10.

Figure 6:
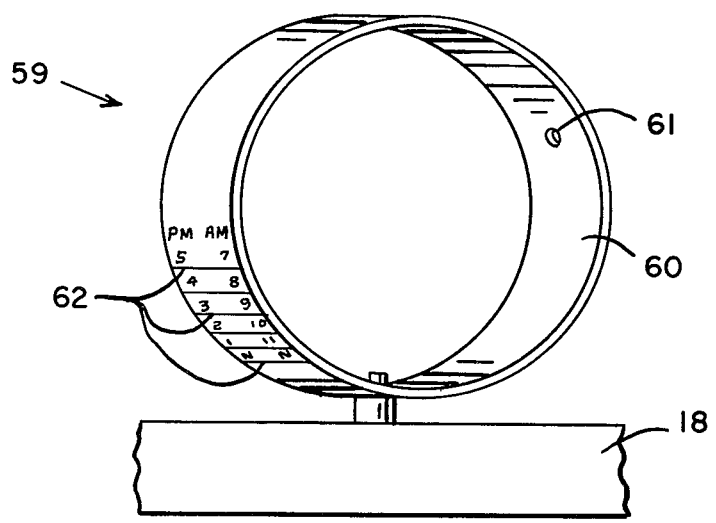
FIG. 6 is a magnified perspective view of the alignment-setting device present on the system illustrated by FIG. 1.

The assembly of FIGS. 1 and 2 also includes a manual alignment device 59 comprising a conventional solar ring timepiece, which is rotatably attached to the carriage, such as to the upper support bar 18, to permit the ring to be rotated about its point of attachment. The alignment device 59, as shown most clearly by FIG. 6, comprises a ring 60, such as of aluminum sheet metal, having a small sun port 61 at about the 2 o'clock position and having a series of marked time lines 62 on its inner surface at between about the 7 o'clock and 9 o'clock positions, as illustrated. The device 59 is pre-calibrated on any horizontal surface, in conjunction with a reliable timepiece, to mark the exact locations of the time lines 62 by rotating the device 59 until port 60 faces the sun and marking the time line in the location of the opposed inner surface where the sun passing through the port 60 hits said surface. This procedure is repeated hourly during the sunlight hours from 7 A.M. until noontime. As the sun's elevation decreases after noontime, it will be noted that the afternoon time lines will inversely correspond to the morning time lines, as shown in FIG. 6. When the calibrated alignment device 59 is rotatably attached to the top carriage bar 18 and the port 61 is pointed towards the sun, the position of the carriage can be changed until the sun spot falls on the correct time line 62, as indicated by a conventional timepiece. The position of the carriage 10 is adjusted by loosening clamps 33 and 34 holding the position adjustment cylinder 48, sliding the cylinder up or down to cause the arm 38 to move the carriage to the correct position, and then retightening the clamps 33 and 34 to secure the cylinder 43 and carriage 10 in place.

The operation of the solar heating system of FIGS. 1 to 5 is as follows. The frame and carriage assembly is mounted in a desired location, such as on a rooftop with the conduit connected as a segment of a continuous circulation conduit of a fluid heat circulation and storage system. If desired or required, several such assemblies may be used in side-by-side relationship and made self-adjustable by individual self-alignment devices 29 or by a single such device connected to a long crossmember which is attached to the underside of the reflector 11 of each of the assemblies. In such case, the central assembly will be as illustrated while the assemblies on each side thereof will not contain the self-adjustment device 29 or the related lens system.

Once the assembly is mounted in position along a true east-west axis with the reflector 11 facing towards the sun's elevation, i.e., facing upwards to the south in the case of an assembly mounted in the northern United States, the adjustment device 29 is moved to the proper position within clamps 33 and 34 to pivot the carriage 10 until the sun's rays enter the lens 53, pass through the central elongated hole 52 of the heat shield 51 and strike the infrared-absorbing plate 42 attached to the heat-conductive flange 41. In such position, the solar altitude is aligned with the focus angle of the lens 53 and the clamps 33 and 35 can be tightened to secure the self-adjustment device 29 and the attached carriage.

Alternatively, the alignment ring 59 may be used to select the position of the carriage 10 so that the axis of the reflector 11 is aligned with the solar altitude, thereby avoiding any activation of the self-adjustment device 29 until the solar altitude drops to coincide with the focus axis of the lens.

The embodiment illustrated by the drawing represents the use of the assembly during the period of the year when the solar altitude increases from the south, i.e., the period between December 21 and June 21 in the case of installations in the northern United States.

The self-adjustment device 29 permits the movement of the axis of the reflector 11 over an angle of about 48° so as to permit tracking of the solar position over a complete six-month period in the case of installations as far north as southern Canada.

The error angle represents the difference between the angle of perfect alignment of the axis of the reflector 11 with the solar altitude over a wide azimuth angle and the change in such angle required to cause the self-adjustment device 29 to be activated to move the carriage 10 until the axis of the reflector 11 is again in perfect alignment with the new higher solar altitude over said wide azimuth angle, i.e., the axis of the carriage is moved to coincide with the previous focus axis of the lens 53.

The self-adjustment device 29 functions by responding to sunlight which is received thereby when the solar position rises into alignment with the focus axis of lens 53, as detected by the lens over an azimuth angle of about 15°. In such case, the sunlight passes through the lens hood 55 and the heat shield opening 52 and strikes the infrared-absorbing plate 42 since these elements are aligned with the focus axis of the lens. The heat generated by the absorbed solar radiation in the plate 42 is conducted to the circular flange 41 which is pressed against the upper surface of the heat-flowable solid present in the cylinder 43, causing said material at the upper surface to be melted or sublimed and to flow from the cylinder 43 through the rear slot 47 and causing the flange 41 to be moved downwardly in the cylinder by the compressed spring 50 and pulling the entire unitary slide assembly 37 downwardly over central guide rod 39, causing attachment arm 38 to pivot the carriage 10 and raise the axis of reflection of reflector 11 to a direction in which it coincides with the previous focus axis of lens 53 and with the current solar altitude. At the same time, the focus axis of lens 53 is raised to a new direction, in advance of the solar altitude, and sunlight is no longer admitted by the heat shield opening 52, thereby permitting the heated plate 42 and attached flange 41 to cool so that the heat-flowable solid is no longer melted or sublimed and again functions as a stop element for the heat-conductive flange 41. This process is repeated every ten days or so as the solar altitude rises in the sky and again coincides with the focus axis of the lens 53.

When the solar altitude reaches its peak on June 21, the focus angle of the lens 53 must be changed to a direction below the solar altitude since the solar altitude will begin to change in reverse direction, i.e., it will begin to lower in the sky until it reaches minimum solar altitude on December 21. This may be accomplished conveniently by rotating the lens mounting plate 54 a full 180° on the surface of reflector 11 to move the lens 53 to a new position 53a shown by means of broken lines in FIG. 5. At the same time, it is necessary to reverse the entire self-adjustment device 29 by detaching the arm 38 from the underside of the reflector 11, releasing clamps 33 and 34 to remove the cylinder 43 and its slide assembly 37, withdrawing the slide assembly 37 from the cylinder 43, inserting a new supply of heat-flowable material, which may conveniently be a curved cylinder of solid wax having a central hole permitting it to be inserted into cylinder 43 over the central guide rod 39. Thereafter, the slide assembly 37 is reinserted and the spring 50 is placed thereover and compressed thereagainst by replacement of cap 44.

Next, the cylinder 43 is inverted and secured upsidedown within clamps 33 and 34 and the attachment arm 38 is reattached to the underside of the reflector 11. The axis of reflection of the carriage or the focus axis of the lens 53 is again aligned with the solar altitude to determine the proper location of the cylinder 43 and then clamps 33 and 34 are tightened to render the solar collection system functional for self-adjusting operating during the next six-month period while the solar altitude decreases in the sky.

The exact composition of the heat-flowable solid material 49 present in the cylinder 43 is not critical so long as such material is changed into a flowable state, i.e., liquid or gas, under the effects of heating by the heat-conductive flange 41. Generally, wax compositions having a melting point within the range of 100° F. to 220° F. are preferred, such as paraffin (130° F.), carnauba (183° F.), microcrystalline (145°-190° F.) or other similar waxes or mixtures of such waxes with each other and/or with softening oils such as mineral oil. Alternatively solid, sublimable materials such as salicylic acid (subl. pt. 169° F.) and benzoic acid (subl. pt. 212° F.) may be used. Preferably, the solid material becomes flowable at temperatures substantially above the highest possible ambient temperatures, i.e., above about 120° F., but sufficiently low to become fluid under the effects of the solar heating of the flange 41 over a period of about three hours or less.

Figure 8:
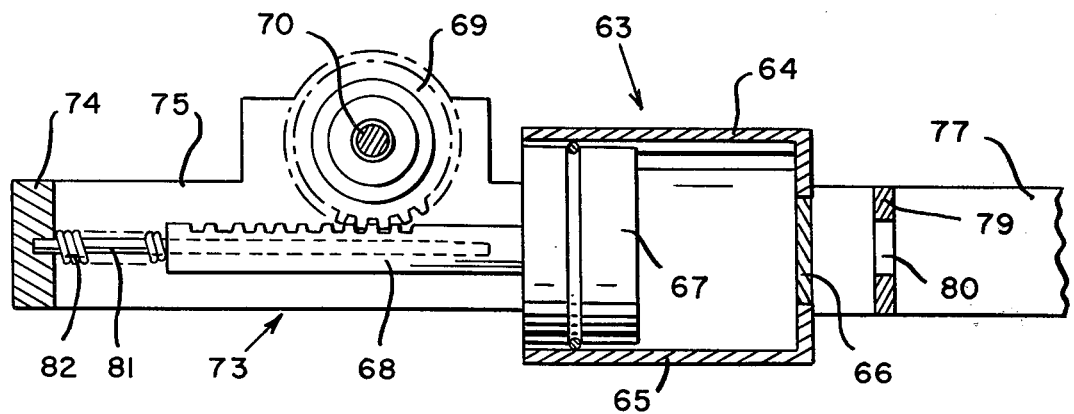
FIG. 8 is a view taken along the line 8—8 of FIG. 7.
Figure 7:
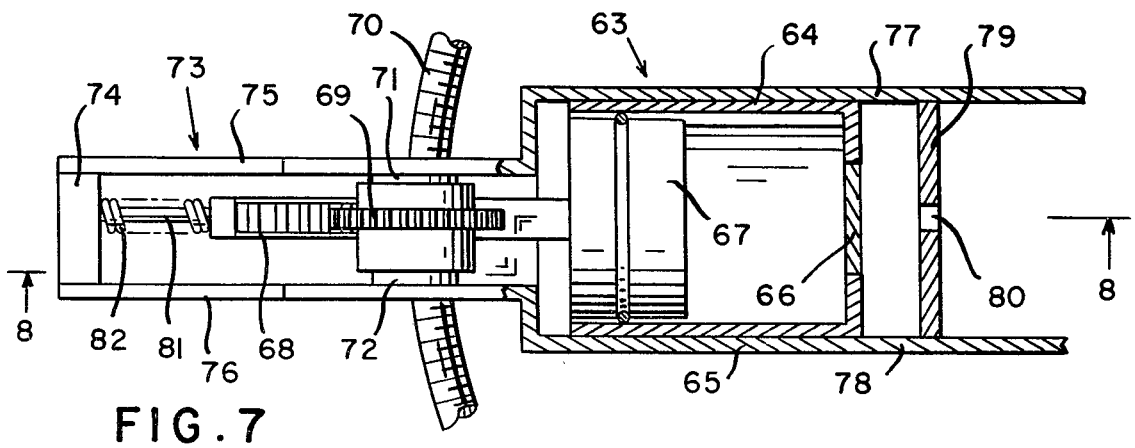
FIG. 7 is a magnified side elevation of another heat-responsive adjustment element which may be used in place of the adjustment element of FIGS. 1 to 5.

The heat-activation of the carriage 10 need not be accomplished by means of heat-flowable material. FIGS. 7 and 8 illustrate another system for moving the carriage 10 in response to heat generated by absorbed solar radiation. For simplicity purposes, the carriage drive means of FIG. 7 and 8 will be described and discussed as a replacement for the cylinder 43 and slide assembly 37 of FIGS. 1 and 2. In other respects, the carriage 10, reflector 11, lens assembly 53 and 54 and support frame 21 are the same as illustrated in FIGS. 1 and 2.

The self-adjustment drive element 63 of FIGS. 7 and 8 functions by means of the heat-expansion properties of liquids or gases and comprises a material container 64 having insulated side walls 65, and infrared radiation-absorbing front wall or plate 66 and a movable rear wall or piston 67 which slidably and sealingly continuously engages the inside surface of the container 64 to prevent escape of the liquid or gas contained therein, the piston 67 being movable away from and towards said plate 66 in response to expansion and contraction of the confined liquid or gas. As illustrated, the piston 67 is attached to a drive mechanism comprising a rack 68 and a pinion ratchet gear 69 threadably engaged on an arcuate threaded track shaft 70 over a narrow segment comprising only a few degrees of the circumference thereof, said mechanism converting the linear forward motion of the piston 67 and rack 68 into rotary motion of the pinion ratchet gear in the clockwise direction, causing the gear 69 to travel down the track 70, the internal clutch of the ratchet mechanism permitting the rack 68 to retract as the heated material within the container 64 cools and contracts and the piston 67 is drawn back into the container 64 by vacuum without imparting any motion to the threaded engagement between the gear 69 and the shaft 70.

As illustrated, the gear 69 has connected thereto thrust bearing 71 and 72 which in turn are connected to a support frame 73 comprising a base wall 74, side walls 75 and 76 connected to the thrust bearings 71 and 72 and attachment arms 77 and 78 which attach the assembly to the underside reflector 11 on the carriage 10 in a manner and position similar to arm 38 of FIG. 1, arms 77 and 78 being attached, one each above and below the lens mounting plate 54 so that the infrared absorbing plate 66 is aligned with the focus axis of the lens. Also attached to said arms 77 and 78 is a heat shield 79 having a central horizontally-elongated slot or hole 80 to restrict the amount of sunlight which can strike the absorbing plate 66, particularly until the focus axis of the lens 53 is aligned with the solar elevation at any point over the wide azimuth angle.

When such alignment occurs, the sun's rays enter the wide angle lens 53, hood 55, wide angle opening 80 in heat-shield 79 and strike the radiation-absorbing plate 66 which may be a black heat-conductive metal. This causes heating and expansion of the liquid (water, ethylene glycol, methanol, etc.) or the gas (air, nitrogen, carbon dioxide, etc.) present in the container 64, which expansion forces the piston 67 to move outwardly and to activate the rack and pinion system causing the pinion to travel down the thread track shaft 70 and causing the arms 77 and 78 to pivot the carriage 10 in the same direction illustrated by FIG. 1.

As illustrated, the rack 68 preferably is connected to the base wall 74 of the support frame 73 of the self-adjustment drive device 63 by means of a pin shaft 81 which is slidingly engaged with a central bore within the rack 68 to maintain the movement of the rack in a straight line, a spring 82 preferably being provided on shaft 81 to provide a slight resistance to the outward movement of the rack 68 and to assist the retraction of the rack during the cooling cycle.

The arcuate track shaft 70 is removably connected to the frame 21, such as to the central rear upright member 30 and the central base cross-member 31 so that it is uniformly spaced from the underside of the arcuate reflector 11 to insure free adjustment of the carriage 10.

As with the system of FIGS. 1 to 5, the self-adjustment system of FIGS. 7 and 8 must also be reversed for the other months of the year, when the solar altitude decreases in the sky. This may be accomplished by substituting for the threaded track shaft 70 and pinion ratchet gear 69 corresponding elements which are reverse-threaded, whereby clockwise rotation of the gear over the shaft will cause the gear and attached assembly to travel up the shaft and to move the axis of reflection of the carriage 10 in the opposite direction. Preferably, however, the pinion ratchet gear 69 is provided with a conventional clutch-reversing lever, similar to one present on a conventional socket wrench, whereby the internal clutch permits the pinion gear 69 to slip when the pinion is engaged by the rack during the outward movement thereof, caused by expansion of the gas within the container 64, and causes the pinion gear 69 to be rotated in reverse direction or counter-clockwise when the pinion is engaged by the rack during its return movement or retraction as the liquid present in container 64 contracts and the piston 67 is drawn back into the container by the vacuum created in the container 64. In this manner, it is merely necessary to turn the clutch-reversing lever and change the focus axis of the lens on December 21 and June 21 to convert the assembly of FIGS. 7 and 8 to one which is self-adjusting in reverse direction to coincide with the reversal in the direction of change of the solar altitude as occurs on those dates, as discussed supra in connection with the assembly of FIGS. 1 to 5.

It will be clear to those skilled in the art that other heat-sensitive mechanical self-adjustment devices may be used in place of those illustrated by the present drawing to provide an apparatus having a solar position-detecting, heat-absorbing system which is focused along an axis in advance of the axis of reflection of the apparatus in the direction in which the solar elevation is changing.

Variations and modifications may be made within the scope of the appended claims. I claim:

1. An apparatus which is adapted to be aligned with the position of the solar elevation over a wide azimuth angle and to adjust itself to remain aligned with the solar elevation changes in either direction, comprising a support structure adapted to support the apparatus on a fixed surface, a movable carriage pivotally attached to said support structure for rotational movement only along a vertical path which corresponds to the path of the solar elevation, said carriage supporting a solar radiation reflector in a position such that the alignment axis of said reflector corresponds to the path of the solar elevation as the degree of such elevation changes over an angle of up to about 48° during the year, a heat-responsive adjustment means supported by said support structure beneath said reflector and having a movable member which is movable in response to a temperature increase within said adjustment means and which is connected to said carriage to cause pivotal movement of said carriage in a given direction over an angle of up to about 48°, a wide angle lens supported by said carriage and adapted to admit direct solar radiation through said reflector to said heat-responsive adjustment means when aligned with the position of the solar elevation over a wide azimuth angle to cause a temperature increase within said adjustment means and to cause pivotal movement of said carriage, said lens having a focus axis which is a few degrees in advance of the alignment axis of said reflector in the direction in which the solar elevation is changing, and a sun shield supported by said carriage in a position between said lens and said heat-responsive adjustment means and adapted to shade the latter when the focus axis of the lens is not aligned with the solar elevation over a wide azimuth angle, whereby when the solar elevation moves out of alignment with said reflector, it moves into alignment with the focus axis of said lens causing solar radiation to be admitted through the reflector to said heat-responsive adjustment means to cause pivotal movement of said carriage until the focus angle of the lens is in advance of and out of alignment with the solar elevation and said heat-responsive adjustment means is shaded by said sun shield.

2. An apparatus according to claim 1 in which said solar radiation reflector is associated with a solar heat collector system.

3. An apparatus according to claim 1 in which said heat-responsive adjustment device comprises an infrared readiation-absorbing member and a sun shield having an opening, said opening and said radiation-absorbing member being in alignment with the focus axis of the lens.

4. An apparatus according to claim 1 which further comprises a solar timepiece attached to said carriage and enabling the proper angular position of the carriage on the support structure to be determined to correspond to any given time of day in which sunshine is present.

5. An apparatus according to claim 1 in which said heat-responsive adjustment means is provided with means for reversing the direction of movement of said movable member when the solar elevation reaches its highest and lowest positions in the sky.

6. An apparatus according to claim 1 in which said heat-responsive adjustment means comprises a container, solid material within said container which becomes flowable in response to increases in temperature and said movable member is provided with means for biasing said member against said solid material for movement of said member through said solid material when said solid material becomes flowable.

7. An apparatus according to claim 1 in which said heat-responsive adjustment means comprises a cylinder, a heat-expandable gas within said cylinder, and a piston which is associated with said movable member and is adapted to move outwardly from said cylinder when said gas is heated and expands.

8. A method for maintaining a solar radiation-reflector in general self-adjusting alignment with the solar elevation over a wide azimuth angle as said elevation changes during the year with respect to the location of said working element, which comprises supporting said reflector on a rotatable support which is adapted to be rotated only along a vertical path corresponding to the various positions in which said reflector is aligned with the solar elevation at any given time of the year, attaching to said rotatable support the arm of a heat-sensitive element which is capable of absorbing infrared radiation and of movement of said arm in response to the heat generated while said infrared radiation is being absorbed, whereby said arm is adapted to move said rotatable support so long as said heat-sensitive element is exposed to sunlight, attaching to said rotatable support a wide angle lens having a focus axis slightly in advance of the alignment axis of said reflector in the direction in which the solar elevation is changing, said lens being adapted to admit direct sunlight through said reflector and cause heating of said heat-sensitive element only when in alignment with the solar elevation over a wide azimuth angle, and positioning said support so that either said lens of said reflector is aligned with the solar elevation to provide a self-adjusting assembly.

9. A method according to claim 8 in which said solar radiation reflector is associated with a solar heat collection system.

* * * * *